US009384568B2

(12) United States Patent
Steen et al.

(10) Patent No.: US 9,384,568 B2
(45) Date of Patent: Jul. 5, 2016

(54) METHOD AND SYSTEM FOR ENHANCED FRAME RATE UPCONVERSION IN ULTRASOUND IMAGING

(71) Applicant: General Electric Company, Schenectady, NY (US)

(72) Inventors: Erik Normann Steen, Moss (NO); Sten Roar Snare, Oslo (NO); Hani Nozari Mirarkolaei, Oslo (NO)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 79 days.

(21) Appl. No.: 14/476,179

(22) Filed: Sep. 3, 2014

(65) Prior Publication Data

US 2016/0063742 A1   Mar. 3, 2016

(51) Int. Cl.
*G06K 9/40* (2006.01)
*G06T 11/00* (2006.01)
(Continued)

(52) U.S. Cl.
CPC ........... *G06T 11/008* (2013.01); *G01S 7/52017* (2013.01); *G06T 7/2086* (2013.01); *G06T 2207/10136* (2013.01); *G06T 2207/20201* (2013.01)

(58) Field of Classification Search
CPC ....... G06T 3/10; G06T 3/4007; G06T 3/4053; G06T 7/0081; G06T 7/20; G06T 7/2086; G06T 11/008; G06T 2207/10016; H04N 5/144; H04N 5/145; H04N 5/21; H04N 5/23248; H04N 5/23254; H04N 5/2327; H04N 5/2353; H04N 5/349; H04N 5/357; H04N 7/012; H04N 7/014; H04N 19/137; H04N 19/51; H04N 19/503; H04N 19/577; H04N 19/85; G01S 7/52017; G01S 7/52034; G01S 7/52044; G01S 7/52071; G01S 7/52074; G01S 15/889; G01S 15/8979; G01S 15/8993; A61B 8/08; A61B 8/0883; A61B 8/13; A61B 8/14; A61B 8/483; A61B 8/4245; A61B 8/4254; A61B 8/4263; A61B 8/461; A61B 8/5207; A61B 8/5276; Y10S 128/916; G09G 2340/0407

See application file for complete search history.

(56) References Cited

U.S. PATENT DOCUMENTS

| | | | |
|---|---|---|---|
| 5,538,004 A * | 7/1996 | Bamber | G01S 7/52044 128/916 |
| 5,845,004 A | 12/1998 | Banjanin | |

(Continued)

OTHER PUBLICATIONS

B.-T. Choi, S.-H. Lee, and S.-J. Ko, "New frame rate up-conversion using bi-directional motion estimation," Consumer Electronics, IEEE Transactions on, vol. 46, No. 3, pp. 603-609, Aug. 2000.

(Continued)

*Primary Examiner* — Jose Couso
(74) *Attorney, Agent, or Firm* — McAndrews, Held & Malloy, Ltd.; Jacob Groethe

(57) ABSTRACT

Various embodiments include systems and methods for providing motion blur reduction to one or more three-dimensional (3D) images, and/or for improving accuracy of motion-compensated frame up-interpolations. The motion blur reduction may comprise application of iterative motion estimation, starting with an initial block size and with reduced block size in each iteration, with a final velocity vector being determined by summing displacement vectors from all iterations. Accuracy of motion-compensated frame up-interpolations may be improved by use of lower resolution frames (or portions of frames), which may be used in generating information used in enhancing motion related features or characteristics of motion-compensated frames.

19 Claims, 7 Drawing Sheets

(51) Int. Cl.
*G01S 7/52* (2006.01)
*G06T 7/20* (2006.01)

(56) References Cited

U.S. PATENT DOCUMENTS

| | | | | |
|---|---|---|---|---|
| 7,362,374 | B2* | 4/2008 | Holt | G06T 7/0081 348/446 |
| 7,771,354 | B2* | 8/2010 | Thiele | A61B 8/08 382/128 |
| 7,791,641 | B2* | 9/2010 | Voronov | H04N 5/144 348/208.1 |
| 8,619,198 | B1* | 12/2013 | Andreev | G11B 27/034 348/701 |
| 2006/0074310 | A1 | 4/2006 | Thiele | |
| 2010/0034448 | A1* | 2/2010 | Lee | G06T 3/4007 382/131 |
| 2015/0164482 | A1* | 6/2015 | Toji | A61B 8/5276 600/443 |

OTHER PUBLICATIONS

S.-J. Kang, S. Yoo, and Y.-H. Kim, "Dual motion estimation for frame rate up-conversion," Circuits and Systems for Video Technology, IEEE Transactions on, vol. 20, No. 12, pp. 1909-1914, Dec. 2010.
J. Astola, P. Haavisto, and Y. Neuvo, "Vector median filters," Proceedings of the IEEE, vol. 78, No. 4, pp. 678-689, 1990.
B. K. Horn and B. G. Schunck, "Determining optical flow," in 1981 Technical Symposium East. International Society for Optics and Photonics, 1981, pp. 185-203.

* cited by examiner

METHOD AND SYSTEM FOR ENHANCED FRAME RATE UPCONVERSION IN ULTRASOUND IMAGING

CLAIMS OF PRIORITY

[Not Applicable]

CROSS-REFERENCE TO RELATED APPLICATIONS/INCORPORATION BY REFERENCE

[Not Applicable]

FIELD OF THE INVENTION

Certain embodiments of the invention relate to ultrasound imaging. More specifically, certain embodiments of the invention relate to methods and systems for enhanced frame rate upconversion in ultrasound imaging and/or for improving accuracy of motion-compensated frame rate up-interpolation.

BACKGROUND OF THE INVENTION

Ultrasound imaging is a medical imaging technique for imaging organs and soft tissues in a human body. Ultrasound imaging uses real time, non-invasive high frequency sound waves to produce two-dimensional (2D) and/or three-dimensional (3D) images.

In some instances, ultrasonic scanners may utilize frame rate upconversion. In this regard, frame rate upconversion may be used when performing ultrasound scans of particular organs (e.g., cardiac scans) where the scan frame rate may be lower than necessary (e.g., too slow to show particular elements and/or features, such as valve movement in the heart). Use of frame rate upconversion, however, may address some of these issues. In particular, frame rate upconversion may make ultrasonic images smoother, and as such it may potentially increase the diagnostic value of the ultrasonic scan.

Various methods may be used to provide frame rate upconversion. For example, frame rate upconversion may be achieved by interpolating frames from existing frames. In this regard, linear interpolation is one way of increasing frame rate. However, ghosting and blurring are the main drawbacks of this type of interpolation. Thus, various techniques may be used in conjunction with frame interpretation to address some of the drawbacks.

For example, motion estimation and motion compensation techniques may be used to address such defects as blurring and ghosting. Nonetheless, motion estimation and motion compensation techniques that are typically used in optical imaging are not suitable for low frame rate cardiac ultrasound imaging, because of speckle noise as well as large movement of the cardiac valves compared to other anatomical features. In this regard, prior art in motion compensated framerate upconversion in optical images, typically focus on the motion estimation.

The most basic way to find the velocity vector is to use regular forward or backward block-matching. This procedure has some flaws, however. For example, as a pixel in the frame to be interpolated may have many or none velocity vectors passing through it, and as such the interpolated frame may contain holes or overlapping pixels. One way to work around the effect of holes and overlaps is to utilize bidirectional motion estimation (BME). In bidirectional motion estimation a regular forward block matching may be performed first, and the result of that matching may then be used as a starting point for a new and limited search starting from a point in the frame to be interpolated. The result is later smoothed and overlap is used to improve robustness. Bidirectional tracking can find erroneous temporal symmetries. Dual motion estimation tries to overcome this problem by adding a reliability test criterion on the bidirectional tracking results. Vectors may be calculated using overlap and if the result is deemed unreliable, neighboring results are weighted in. This method is limited, however, by the quality of the reliability test criterion. One criterion can be the discrepancy between estimated forward and backward velocity vectors.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for enhanced frame rate upconversion in ultrasound imaging, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
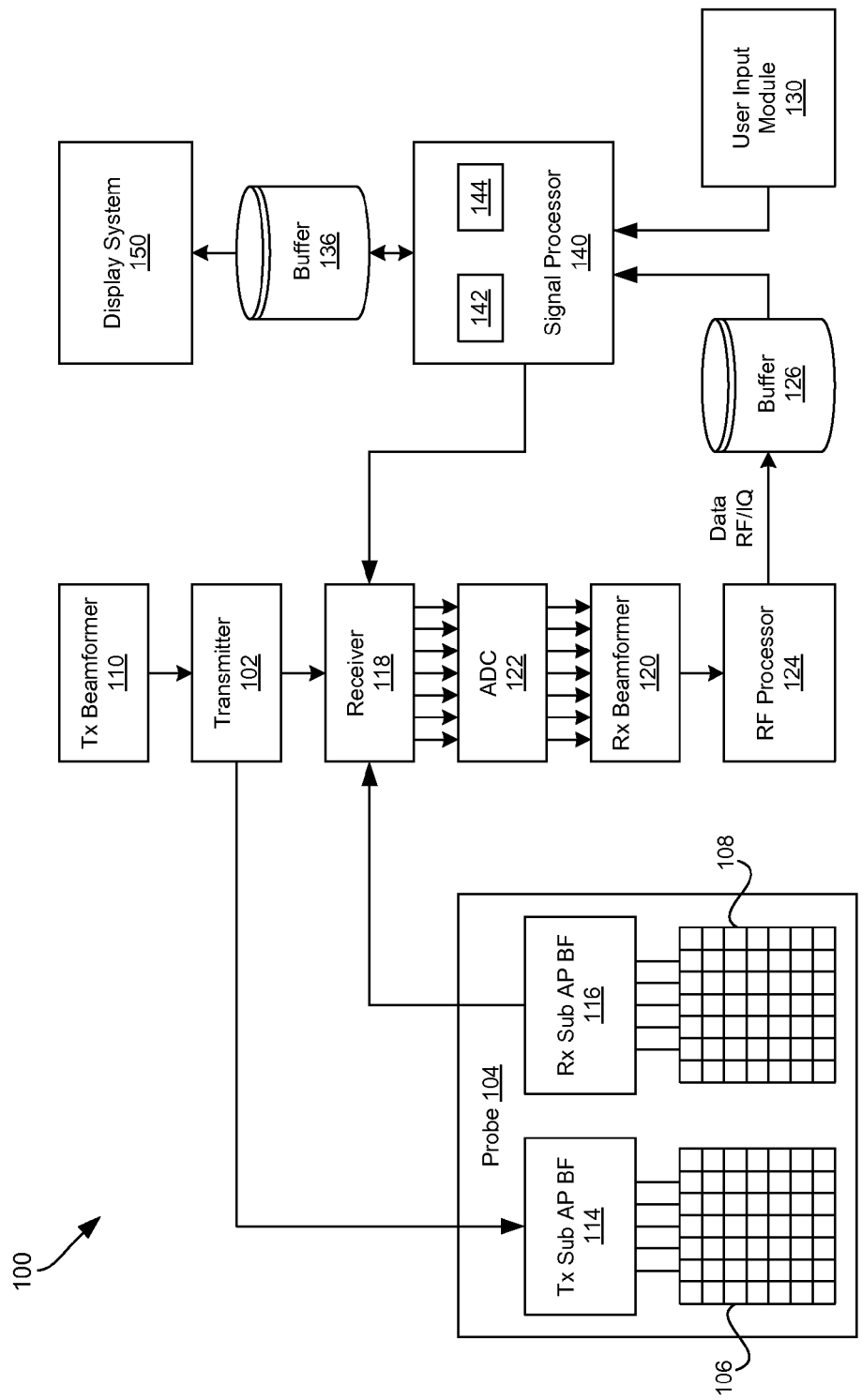
FIG. 1 is a block diagram illustrating an example ultrasound system that is operable to provide enhanced frame rate upconversion in ultrasound imaging, in accordance with an embodiment of the invention.

Certain embodiments of the invention may be found in a method and system for providing adaptive blood flow visualization by calculating and applying an enhancement factor to each of the pixels in color flow ultrasound image data based on regional flow characteristics detected within the color flow ultrasound image data.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings. It should also be understood that the embodiments may be combined, or that other embodiments may be utilized and that structural, logical and electrical changes may be made without departing from the scope of the various embodiments of the present invention. The following detailed description is, therefore, not to be taken in a limiting sense, and the scope of the present invention is defined by the appended claims and their equivalents.

As used herein, an element or step recited in the singular and proceeded with the word "a" or "an" should be understood as not excluding plural of said elements or steps, unless such exclusion is explicitly stated. Furthermore, references to "an embodiment," "one embodiment," "a representative embodiment," "an example embodiment," "various embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

In addition, as used herein, the phrase "pixel" also includes embodiments of the present invention where the data is represented by a "voxel". Thus, both the terms "pixel" and "voxel" may be used interchangeably throughout this document.

Also as used herein, the term "image" broadly refers to both viewable images and data representing a viewable image. However, many embodiments generate (or are configured to generate) at least one viewable image. In addition, as used herein, the phrase "image" is used to refer to an ultrasound mode such as B-mode, CF-mode and/or sub-modes of CF such as TVI, Angio, B-flow, BMI, BMI Angio, and in some cases also MM, CM, PW, TVD, CW where the "image" and/or "plane" includes a single beam or multiple beams.

Furthermore, the term processor or processing unit, as used herein, refers to any type of processing unit that can carry out the required calculations needed for the invention, such as single or multi-core: CPU, Graphics Board, DSP, FPGA, ASIC, or a combination thereof.

It should be noted that various embodiments described herein that generate or form images may include processing for forming images that in some embodiments includes beamforming and in other embodiments does not include beamforming. For example, an image can be formed without beamforming, such as by multiplying the matrix of demodulated data by a matrix of coefficients so that the product is the image, and wherein the process does not form any "beams". Also, forming of images may be performed using channel combinations that may originate from more than one transmit event (e.g., synthetic aperture techniques).

In various embodiments, ultrasound processing to form images is performed, including frame rate upconversion for example, in software, firmware, hardware, or a combination thereof. One implementation of an ultrasound system in accordance with various embodiments is illustrated in FIG. 1.

FIG. 1 is a block diagram illustrating an example ultrasound system that is operable to provide enhanced frame rate upconversion in ultrasound imaging, in accordance with an embodiment of the invention. Shown in FIG. 1 is an ultrasound system 100.

The ultrasound system 100 comprises, for example, a transmitter 102, an ultrasound probe 104, a transmit beamformer 110, a receiver 118, a receive beamformer 120, a RF processor 124, a RF/IQ buffer 126, a user input module 130, a signal processor 140, an image buffer 136, and a display system 150.

The transmitter 102 may comprise suitable circuitry that may be operable to drive an ultrasound probe 104. The ultrasound probe 104 may comprise a two dimensional (2D) or three dimensional (3D) array of piezoelectric elements. The ultrasound probe 104 may comprise a group of transmit transducer elements 106 and a group of receive transducer elements 108, that normally constitute the same elements. The transmitter 102 may be driven by the transmit beamformer 110. In this regard, the transmit beamformer 110 may comprise suitable circuitry that may be operable to control the transmitter 102 which, through a transmit sub-aperture beamformer 114, drives the group of transmit transducer elements 106 to emit ultrasonic transmit signals into a region of interest (e.g., human, animal, underground cavity, physical structure and the like).

The group of transmit transducer elements 106 can be activated to transmit ultrasonic signals. The ultrasonic signals may comprise, for example, pulse sequences that are fired repeatedly at a pulse repetition frequency (PRF), which may typically be in the kilohertz range. The pulse sequences may be focused at the same transmit focal position with the same transmit characteristics. A series of transmit firings focused at the same transmit focal position may be referred to as a "packet". The transmitted ultrasonic signals may be backscattered from structures in the object of interest, like tissue, to produce echoes. The echoes are received by the receive transducer elements 108.

The group of receive transducer elements 108 in the ultrasound probe 104 may be operable to convert the received echoes into analog signals, undergo sub-aperture beamforming by a receive sub-aperture beamformer 116 and are then communicated to a receiver 118.

The receiver 118 may comprise suitable circuitry that may be operable to receive and demodulate the signals from the receive sub-aperture beamformer 116. The demodulated analog signals may be communicated to one or more of the plurality of A/D converters (ADCs) 122.

Each plurality of A/D converters 122 may comprise suitable circuitry that may be operable to convert analog signals to corresponding digital signals. In this regard, the plurality of A/D converters 122 may be configured to convert demodulated analog signals from the receiver 118 to corresponding digital signals. The plurality of A/D converters 122 are disposed between the receiver 118 and the receive beamformer 120. Notwithstanding, the invention is not limited in this regard. Accordingly, in some embodiments of the invention, the plurality of A/D converters 122 may be integrated within the receiver 118.

The receive beamformer 120 may comprise suitable circuitry that may be operable to perform digital beamforming processing to, for example, sum the delayed channel signals received from the plurality of A/D converters 122 and output a beam summed signal. The resulting processed information may be converted back to corresponding RF signals. The corresponding output RF signals that are output from the receive beamformer 120 may be communicated to the RF processor 124. In accordance with some embodiments of the invention, the receiver 118, the plurality of A/D converters 122, and the beamformer 120 may be integrated into a single beamformer, which may be digital.

The RF processor 124 may comprise suitable circuitry that may be operable to demodulate the RF signals. In accordance with an embodiment of the invention, the RF processor 124 may comprise a complex demodulator (not shown) that is operable to demodulate the RF signals to form I/Q data pairs (e.g., B-mode and color IP I/Q data pairs) which may representative of the corresponding echo signals. The RF or IQ signal data may then be communicated to an RF/IQ buffer 126.

The RF/IQ buffer 126 may comprise suitable circuitry that may be operable to provide temporary storage of output of the RF processor 124—e.g., the RF or IQ signal data, which is generated by the RF processor 124.

The user input module 130 may comprise suitable circuitry that may be operable to enable obtaining or providing input to the ultrasound system 100, for use in operations thereof. For example, the user input module 130 may be used to input patient data, surgical instrument data, scan parameters, settings, configuration parameters, change scan mode, and the like. In an example embodiment of the invention, the user input module 130 may be operable to configure, manage and/or control operation of one or more components and/or modules in the ultrasound system 100. In this regard, the user input module 130 may be operable to configure, manage and/or control operation of transmitter 102, the ultrasound probe 104, the transmit beamformer 110, the receiver 118, the receive beamformer 120, the RF processor 124, the RF/IQ buffer 126, the user input module 130, the signal processor 140, the image buffer 136, and/or the display system 150.

The signal processor 140 may comprise suitable circuitry that may be operable to process the ultrasound scan data (e.g., the RF and/or IQ signal data) and/or to generate corresponding ultrasound images, for presentation on a display system 150. The signal processor 140 is operable to perform one or more processing operations according to a plurality of selectable ultrasound modalities on the acquired ultrasound scan data. In some instances, the signal processor 140 may be operable to perform compounding, motion tracking, and/or speckle tracking. Acquired ultrasound scan data may be processed in real-time during a scanning session as the color flow and B-mode echo signals are received. Additionally or alternatively, the ultrasound scan data may be stored temporarily in the RF/IQ buffer 126 during a scanning session and processed in less than real-time in a live or off-line operation.

In an example embodiment of the invention, the signal processor 140 may be operable to perform frame rate upconversion, and particularly to do so in enhanced manner. In this regard, the signal processor 140 may comprise a frame rate upconversion module 142, which may be configured to perform the necessary processing to facilitate the frame rate upconversion. In particular, the frame rate upconversion module 142 may be configured to perform motion compensated frame rate upconversion (or frame interpolation), to enable increasing display frame rate in ultrasound imaging, such that ensure smooth playback, particularly in three-dimensional (3D) images, where acquisition frame rate may be low. In some instances, the signal processor 140 may comprise a dedicated motion processing module 144, which may be configured to perform motion related processing—e.g., motion estimation and/or compensation related processing. Thus, motion related processing may be performed by the signal processor 140 even when no frame rate up-conversion is being done in the ultrasound system 100.

In operation, the ultrasound system 100 may be used in generating ultrasonic images, including two-dimensional (2D) and/or three-dimensional (3D) images. In this regard, the ultrasound system 100 may be operable to continuously acquire ultrasound scan data at a particular frame rate, which may be suitable for the imaging situation in question. For example, frame rates may range from 20-70 but may be lower or higher. The acquired ultrasound scan data may be displayed on the display system 150 at a display-rate that can be the same as the frame rate, or slower or faster. An image buffer 136 is included for storing processed frames of acquired ultrasound scan data that are not scheduled to be displayed immediately. Preferably, the image buffer 136 is of sufficient capacity to store at least several seconds' worth of frames of ultrasound scan data. The frames of ultrasound scan data are stored in a manner to facilitate retrieval thereof according to its order or time of acquisition. The image buffer 136 may be embodied as any known data storage medium.

In some instances, the ultrasound system 100 may be configured to support grayscale and color based operations. For example, the signal processor 140 may be operable to perform grayscale B-mode processing and/or color processing. The grayscale B-mode processing may comprise processing B-mode RF signal data or IQ data pairs. For example, the grayscale B-mode processing may enable forming an envelope of the beamsummed receive signal by computing the quantity $(I^2+Q^2)^{1/2}$. The envelope can undergo additional B-mode processing, such as logarithmic compression to form the display data. The display data may be converted to X-Y format for video display. The scan-converted frames can be mapped to grayscale for display. The B-mode frames that are provided to the image buffer 136 and/or the display system 150. The color processing may comprise processing color based RF signal data or IQ data pairs to form frames to overlay on B-mode frames that are provided to the image buffer 136 and/or the display system 150. The grayscale and/or color processing may be adaptively adjusted based on user input—e.g., a selection from the user input module 130, for example, for enhance of grayscale and/or color of particular area.

In various implementations, the ultrasonic system 100 may be configured to perform (e.g., via the signal processor 140, particularly the frame rate upconversion module 142 and/or the motion processing module 144 thereof) motion compensated frame rate upconversion, to enable increasing display frame rate (e.g., display rate in the display system 150), such that to ensure smooth playback, during ultrasound imaging. In particular, the motion compensated frame rate upconversion implemented in the ultrasonic system 100 may be configured such that it may be particularly optimized for three-dimensional (3D) ultrasonic imaging and/or for use with objects or structures with rapid movement.

In this regard, traditional frame interpolation techniques (e.g., linear, cubic, FIR, IIR, etc.) may cause severe motion blur during ultrasonic imaging, particularly in certain use scenarios and/or under certain conditions. Such issues may be encountered, for example, when attempting to obtain ultrasonic images of areas and/or objects subject to rapid movement—e.g., in echocardiography, with respect to such areas and/or rapidly moving objects as heart valves. In this regard, as a result of such rapid movement, the pertinent areas or objects may be moving or changing in between frames, and interpolating captured frames may result in frames that may not accurately reflect the conditions of the pertinent areas or objects between the captured frames.

Some of the issues that may arise with frame interpolation may be addressed by use of motion estimation and motion compensation techniques, particularly to address such defects as blurring and ghosting. With motion compensated frame rate upconversion, movement estimates may be used when deriving an interpolated frame, to ensure that the frame is free of motion blurring or artifacts. For example, velocity (or motion) vectors may be determined or estimated for each point in the to-be-interpolated frame, to enable making better estimates of the position of the point in the interpolated frame. The most basic way to find the velocity vector is to use regular forward and/or backward block-matching. In this regard, assuming that the frame to be interpolated is frame n, the frames can be generated based on the equations (Eq. 1)

$$f_n(x, y) = \frac{1}{2}(f_{n-1}((x, y) - \vec{v}) + f_{n+1}((x, y) + \vec{v}))$$

Thus, the more robust the derived estimates for the velocity vectors are, the more accurate the movements and positions of points may be in the interpolated frames. Existing motion estimation and compensation schemes and/or techniques have some flaws and drawbacks, however. In particular, most of these schemes and/or techniques may not properly handle use scenario where the motion is very fast or the frame rate is very low. Further, the applicability of such schemes and/or techniques may be strongly limited in 3D imaging. In this regard, as noted above, in various motion compensated frame rate up-conversion schemes, estimates of structure movement may be used in attempting to derive an interpolated frame free of motion blurring or artifacts. It is particularly important in such schemes to derive robust estimates for the velocity vectors. Existing motion compensated frame rate up-conversion schemes, particularly in optical images, typically focus on the motion estimation, however. Thus, issues may arise with existing motion estimation and motion compensation schemes and/or techniques in certain situations, particularly where certain pixels in the frame to be interpolated may have many or none velocity vectors passing through them, and as such the interpolated frame may contain holes or overlapping pixels. This is the case, for example, in 3D imaging and/or in creation use scenario such as low frame rate cardiac ultrasound imaging, because of speckle noise as well as large movement of the cardiac valves compared to other anatomical features.

In bidirectional motion estimation (BME) a regular forward block matching is performed first, and the result of that matching is used as a starting point for a new and limited search starting from a point in the frame to be interpolated. The result is later smoothed and overlap is used to improve robustness. A major drawback of BME tracking is that it may result in false of erroneous temporal symmetries, due to the way the forward/backward searches are performed. Dual motion estimation (DME) addresses the possible issues that may be caused by BME tracking, by applying to the bidirectional tracking results a reliability test criterion. In this regard, motion vectors may be calculated using overlap and if the result is deemed unreliable, neighboring results are weighted in. This scheme is limited, however, by the quality of the reliability test criterion. One criterion can be the discrepancy between estimated forward and backward velocity vectors. A major drawback of the DME scheme, however, is that it only works well on slow moving areas and/or objections, and that it is not particularly suited for 3D imaging. The BME and DME schemes are described in more details, below (e.g., with respect to FIGS. 2A and 2B).

Accordingly, and to address the drawings and/or limitations of existing schemes, the ultrasonic system 100 may be configured to incorporate new scheme that overcome issues with existing schemes, such that to enhance ultrasonic imaging, particularly with respect with rapid moving objects and/or 3D imaging. For example, the motion compensated frame rate upconversion and/or frame interpolation may be performed based on fixed point motion estimation (FPME) scheme, which may expand the bidirectional tracking method. With the FPME scheme, motion estimation may be applied iteratively, starting off with dual motion estimation with large block sizes. The search size (block size) may be reduced for each iteration. The final velocity vector may then be determined based on summing of the displacement vectors from all iterations.

The results may be filtered by a vector median filter to remove outliers. Further, blockiness artifacts may be reduced by a block motion compensator. The vector field may then be regularized, such as by using it as an input in an optical flow stage, in which an estimation method or algorithm (e.g., the Horn-Schunck optical flow method) is applied. As long as the initial vector field is nearly correct, the optical flow stage will ensure a smooth vector field. Accordingly, the FPME scheme may enable increasing the perceived frame rate by adding motion compensated interpolated frames between low frame rate acquisition frames without blurring or causing artifacts around the heart valves or other rapidly moving objects. The FPME is described in more details, below.

Accordingly, ultrasonic systems or devices (e.g., the ultrasonic system 100) incorporating the enhanced schemes (e.g., the newly developed FPME scheme) may yield more robust estimates of the movement of the structures in the frames before and after the frame to be interpolated, which may in turn be used to derive an interpolated frame without motion blur. Although mostly relevant for 3D ultrasound, the enhanced scheme may apply similarly to 2D ultrasonic imaging, being particularly desirable for use with rapidly moving objects or structures, where even existing scheme may be deficient. Accordingly, the new schemes may enable overcoming the problem of motion blurring of rapidly moving objects when interpolating ultrasound frames having low frame rate, and may also make it possible to perform frame interpolation in 3D recordings with low acquisition frame rate without blurring rapidly moving objects such as heart valves. Thus, display frame rate may be increased without introducing motion artifacts, yielding a smoother playback.

In some example implementations, ultrasonic systems or devices, such as the ultrasound system 100, may incorporate measures for improving accuracy of motion-compensated frame rate up-interpolation. In this regard, motion compensated frame rate up-interpolation methods are commonly used in up-converting low frame rate content. Such methods have been in multimedia industry (e.g., for up-converting low frame rate content, such as 24 Hz Blu-ray, to high refresh rates used by the TVs). Similarly, motion compensated frame rate up-interpolation methods have been used in ultrasound imaging. These methods may use various techniques, including, for example, speckle tracking, feature tracking, multi resolution optical flow, energy minimization schemes, or a combination of such methods to create motion trajectories.

Nonetheless, motion compensated up-interpolation methods may have some shortcomings and/or may cause some issues. In particular, while frame rate up-interpolation methods may improve the perceived frame rate, and may work well for most images (or parts thereof), such methods are prone to introducing artifacts in certain areas and/or under certain conditions. For example, a general and fundamental problem with 3D ultrasound imaging and/or ultrasound imaging of certain objects or structures, is that it is may be hard (or even impossible) to acquire volume with high spatial resolution and high temporal resolution at the same time. An inherent problem of frame rate up-interpolation methods in cardiac ultrasounds, for example, is that some structures, such as heart valves, change significantly. In this regard, in the areas surrounding the heart valves, artifacts may be introduced due to the rapid movement of the heart valves, which causes the heart valves to move and deform significantly from one image (volume).

Thus, improving motion-compensated frame rate up-interpolation may be desirable or even necessary, particularly for 3D ultrasound images and/or with respect to use of ultrasonic imaging of particular objects or structures (e.g., cardiac ultrasonic imaging) where the frame rate of high resolution volume acquisitions may be severely limited. Accordingly, accuracy of the motion-compensated frame rate up-interpolation may be improved by incorporating into ultrasonic systems or devices (e.g., the ultrasonic system 100) particular measures to handle areas that may be otherwise subject to introduction of artifacts during motion-compensated frame rate up-interpolation.

For example, the ultrasonic system 100 may be configured to emit additional beams after acquiring a 3D volume, and information from these additional emissions (e.g., being obtained by processing, such as via the signal processor 140, images and/or other data acquired as result of these additional emissions), may be used to assist the up-interpolation algorithms applied in the system. In example implementations, the improvement may be achieved by acquiring lower resolution frames (or parts thereof), which may be used to enhance the main (e.g., high resolution) frames, particularly correcting possible artifacts. For example, the ultrasonic system 100 may be configured to implement a frame interleaved acquisition scheme, in which frames (e.g., lower resolution) may be acquired and used in enhancing the main (e.g., high resolution) frames. In this regard, after acquiring one high resolution volume (image) over a period of time (e.g., 90 ms), another lower resolution volume (image) may be acquired during a much shorter period of time (e.g., 10 ms). Alternatively the ultrasonic system 100 may be configured to implement a frame interleaved acquisition scheme, whereby the lower resolution volume (image) may be acquired in-between firings used to create the high resolution volume (image). For example, one low resolution plane of the lower resolution volume may be acquired after each n planes of the high resolution volume.

The lower resolution volume (image) may cover only a part of the high resolution volume (image). For example, in an apical scan, the mitral valves may cover 50% of the volume and this portion can be predetermined or computed—e.g., based on pre-configured database or library. This would further shorten the amount of time spent on acquiring the low resolution volume. The low resolution volume is then used to assist an up-interpolation algorithm that creates intermediate high resolution volume(s) between the original ones. The lower resolution volume is thus never shown directly to the user.

Various techniques may be used in utilizing the low resolution volume in the subsequent up-interpolation algorithms. For example, motion of structures may be tracked from the high resolution volume to the subsequent low resolution volume, and then from the low resolution volume to the next high resolution volume. Another way is to first track motion from one high resolution volume to the next high resolution volume, and then use the motion trajectories as initialization of a refined tracking that uses the intermediate low resolution volume. Thus, instead of one motion field one will have two subsequent motion fields that can be used as motion trajectories when interpolating between the two high resolution volumes.

Figure 2A:
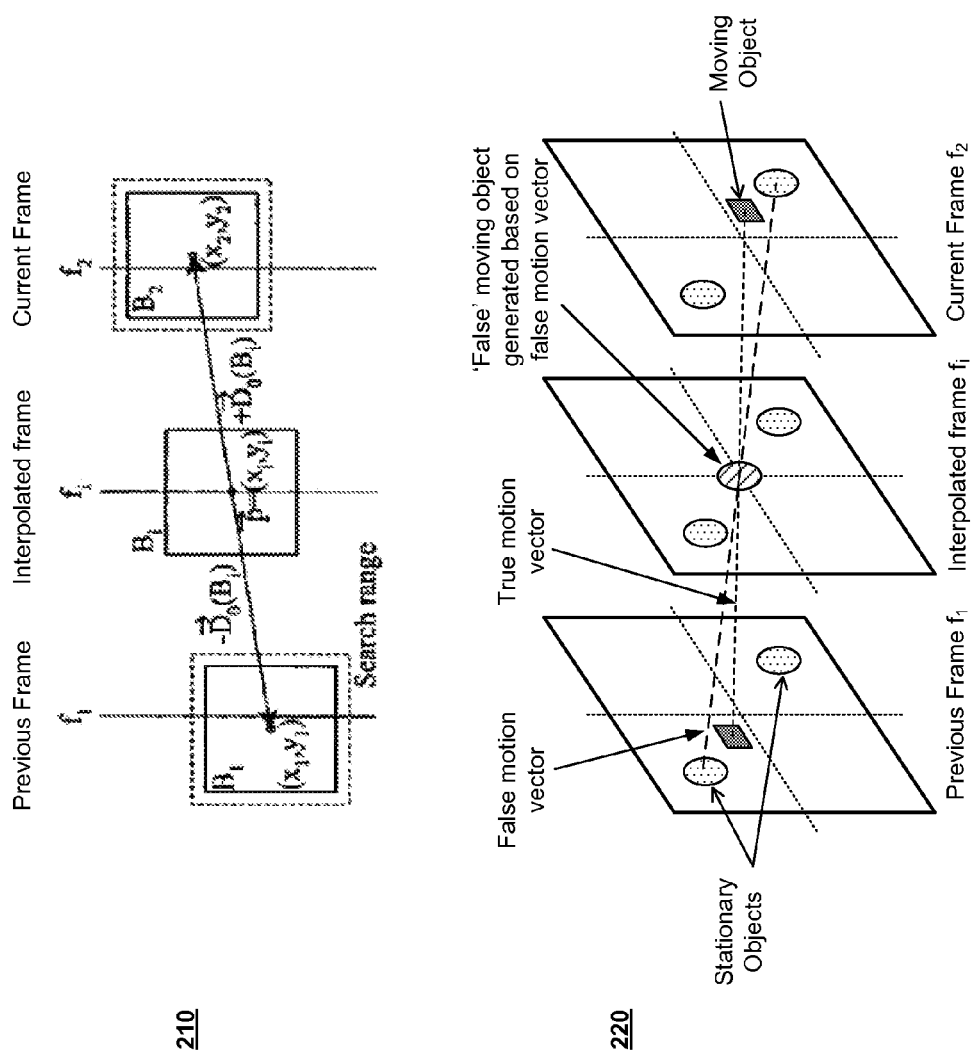
FIG. 2A is a block diagram illustrating use of bidirectional motion estimation (BME) in interpolating fames.

FIG. 2A is a block diagram illustrating use of bidirectional motion estimation (BME) in interpolating fames. Shown in FIG. 2A are charts 210 and 220, demonstrating example use scenarios of bidirectional motion estimation (BME) when interpolating a frame from a current and previous frames, and demonstrating error estimation occurring when using BME.

Chart 210 depicts an example use of bidirectional motion estimation (BME) when generating an interpolated frame $f_i$ based on a current frame $f_2$ and a previous frame $f_1$. In this regard, bidirectional motion estimation (BME) is used to provide interpolated frames, and particularly do so while addressing defects that may occur when interpolating frames—e.g., removing overlapped pixels and "hole" regions in the interpolated frames. With BME, instead of searching in forward or backward directions for motion estimation, the search may be started in the frame to-be-interpolated. Therefore, there won't be any "hole" regions in the up interpolated frame. Thus, BME is based on searching for temporal symmetries. When applying BME, an initial stage may comprise subsampling each frame to initial motion estimation. This is done for reducing computational complexity and to enable finding smoothed motion vectors. The estimated motion vector may then be obtained and used as initial value for bidirectional motion estimation. To find motion vectors, full search block-matching is used in subsampled images. In the following stage, refinement of the previous motion vectors may be performed. In this regard, the estimated motion vectors may be refined by a small search range in the full scale image, as shown in chart 210 of FIG. 2A, with initial motion vector and center of the block in the interpolated frame $\vec{p}=(x_i, y_i)$, a search for the final matching may be. To reduce the complexity, searching in forward and backward direction may be done in same direction. In the following stage, spatio-temporal smoothness may be applied on the bidirectional motion vectors. For example, for each particular block B, a number of neighboring blocks (e.g., 8) may be used in applying the spatio-temporal smoothness. In this regard, to determine smooth motion vector for the particular block B, the neighboring blocks' motion vectors may be considered at the same time with the particular block. This smoothness aims to find the motion vector for the current block B which makes the minimum error in block matching. For example, to assign motion vector for particular block, a search may be conducted in space comprising the particular block and its neighboring blocks for candidates of motion vectors. The motion vector is then selected from the candidate motion vectors these motion vectors (e.g., the motion vector for the particular block B and its 8 neighbor blocks) for motion vectors), being the one that minimizes the following optimization equation (Eq. 2):

$$h(\vec{v},B)=\Sigma_{p\in B}|f_1(P-i)-f_2(P+i)|$$

where $f_1$ and $f_2$ are previous and current frames, respectively; and $\vec{v}$ being any of the candidate motion vectors.

One major drawback of the BME scheme is that it may cause erroneous (or false) objects, or placement thereof in interpolated frames, due to false temporal symmetries. In particular, in instances where there may be spurious temporal symmetry, in a patterned background or from similar (or identical) objects, in the previous and next frames, the bidirectional motion estimation may result in incorrect (false) motion vectors. This is illustrated in chart 220, which depicts a false object being generated in the interpolated frame $f_i$ as a result of the false motion vector caused by false temporal symmetry. In the particular example shown in chart 220, there may be two stationary object and a moving object in a particular portion of the previous and current frames $f_1$ and $f_2$. Naturally, the moving object must be identified as such—that is as a moving object. However, the stationary objects have a repeated pattern and exhibit spurious temporal symmetry between the previous and current frames. Therefore, the bidirectional motion estimation may incorrectly determine that the patterns corresponding to the stationary object may correspond instead to another object that is also in motion, and as such the interpolated frame may be generated using this incorrect information, showing a false moving object.

Figure 2B:
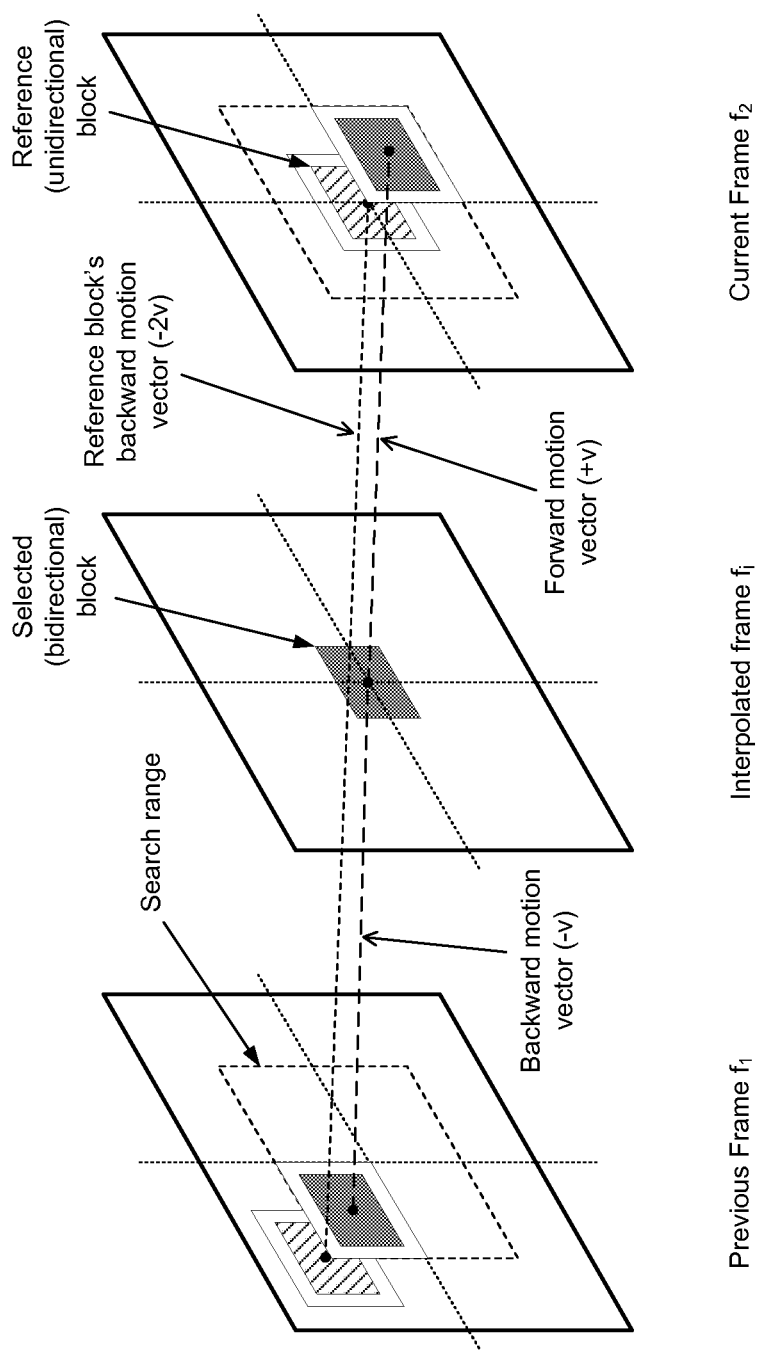
FIG. 2B is a block diagram illustrating use of dual motion estimation (DME) in interpolating fames.

FIG. 2B is a block diagram illustrating use of dual motion estimation (DME) in interpolating fames. Shown in FIG. 2B is chart 230, which depicts an example use scenario of dual motion estimation (DME) when generating an interpolated frame $f_i$ based on a current frame $f_2$ and a previous frame $f_1$.

The dual motion estimation (DME) scheme builds on the bidirectional motion estimation (BME) scheme, as described above, by adding extra reliability tests and/or criteria to enhance the estimation accuracy of motion vectors obtained by BME. In particular, the DME scheme incorporate a validity test identify, as much as possible, possible falsities caused by the BME method. In this regard, while the BME method may work well, especially for the motion compensation and frame rate up conversion, its main drawback is false temporal symmetry, which may cause determining incorrect motion vectors that in turn result in false moving objects or structures. The DME addresses these issues by, for example, incorporating a validity test that uses unidirectional and bidirectional matching ratios of blocks in the previous and next (current) frames to assist in identifying possible false motion vectors. This is illustrated in chart 230 of FIG. 2B. In this regard, when generating the interpolated frame $f_i$, bidirectional motion estimation may be applied first, to a selected (bidirectional) block; resulting in two motion vectors: a forward motion vector ($+\vec{v}$) and a backward motion vector ($-\vec{v}$) for the selected block in the to-be-interpolated frame. After determining the motion vector of the moving object by bidirectional method, backward motion estimation may be applied on a reference (unidirectional) block in the current frame $f_2$. The reference block is centered, in the current frame $f_2$, at same position as the selected block in the to-be-interpolated frame $f_i$. The relative positing of the reference and selected blocks may be used to determine the backward motion vector of the reference block ($-2\vec{v}$) to the pervious frame $f_1$. The backward motion vectors of the selected and referenced blocks are then compared. If these two motion vectors are in the same direction (with some tolerance in the directions), then the motion vector(s) of the selected block may be deemed reliable. The matched block may be found using such techniques as Sum of Absolute Difference (SAD).

In addition to use of DME (to mitigate possible issues with BME), there are schemes that have also been suggested as alternatives to bidirectional motion estimation. In particular, there are other methods that use unidirectional motion estimation based approaches to obtain more reliable motion vectors than the bidirectional ones, particularly for pixel values in the previous and next frame are known. For example, in some schemes unidirectional forward motion estimation (UFME) and unidirectional backward motion estimation (UBME) with restricted search area are used to find the reliable motion vectors. Nonetheless, as with dual motion estimation (DME), these methods may only work well on slow motion parts, and/or the complexities of these schemes make them particularly inadequate with 3D imaging.

Figure 3:
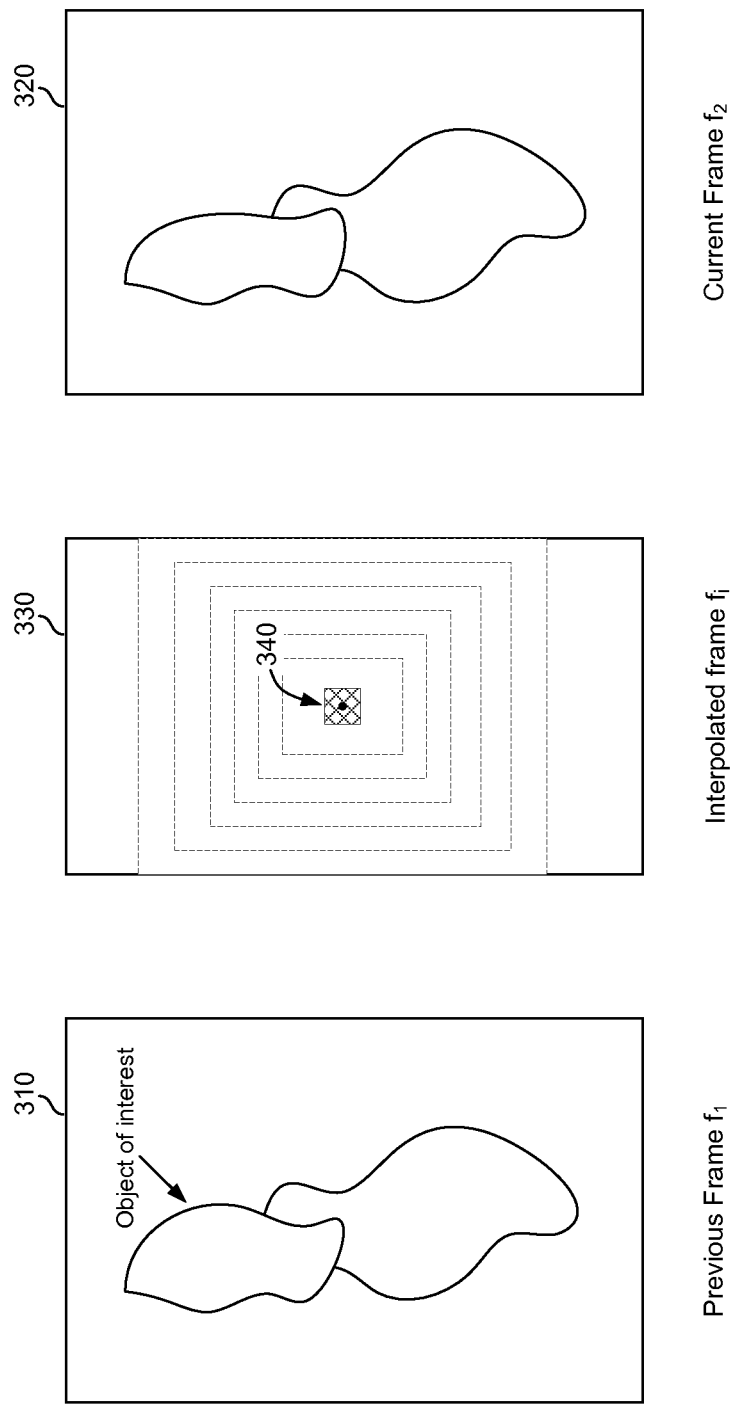
FIG. 3 is a block diagram illustrating use of fixed point motion estimation (FPME) in interpolating fames, in accordance with an embodiment of the invention.

FIG. 3 is a block diagram illustrating use of fixed point motion estimation (FPME) in interpolating fames, in accordance with an embodiment of the invention. Shown in FIG. 3 is an example use scenario 300 in which an interpolated frame $f_i$ (or portion thereof) is generated based on a current frame $f_2$ and a previous frame $f_1$ (or corresponding portions therein), using fixed point motion estimation (FPME), in accordance with an embodiment of the present invention.

The fixed point motion estimation (FPME) method provided enhanced approach for estimating motion in interpolated frames, thus making particularly optimal for use in 3D imaging and/or with rapid moving objects or structures. The fixed point motion estimation (FPME) is based on defining, for any point in space (or vector), a sequence of numbers (or vectors) that may converge to that point. With reference to FIG. 3, in an example use scenario FPME is being applied to two successive frames, current frame $f_2$ and a previous frame $f_1$, with the goal of finding the interpolated frame $f_i$. To that end, when applying FPME the interpolated frame (or area thereof) may be partitioned regularly by n×n blocks with overlaps (shown as dashed blocks in FIG. 3). A sample block is the center, identified by reference number 340. In bidirectional motion estimation, an N×N block would have been be selected in the interpolated frame (or the pertinent area thereof), and the sum of absolute differences (SAD) criteria would have been used to find the best match in forward and backward directions.

The interpolated patch in the interpolated frame (or the pertinent area thereof) around the sample block 340 will be average of two matched patches from previous and next frame. As long as bidirectional motion estimation just looks for temporal symmetry, it fails when there are similarities in the image's texture. The FPME adds reliability tests and/or criteria—e.g., as is the case with DME, by incorporating relatability test into bidirectional estimation based on backward motion vectors. Unlike DME, however, with fixed point motion estimation, the reliability test is applied in adaptive manner, whereby the search patch is changed in size and/or direction.

In this regard, with motion estimation and motion compensation (interpolating part) there may be two pertinent factors: 1) the larger the patches the better the motion estimation; and 2) the smaller the patches the better the interpolated frame. Whereas existing schemes are configured based on consideration of only one of these two factors—that is to either improve motion estimation or to improve interpolation— with FPME, these two criteria are considered simultaneously.

Thus, in accordance with the FPME scheme, when applying frame interpolation to up-convert frame rate during 3D ultrasonic imaging and/or when attempting to generate images for objects or structures that have rapid and/or complex movement (e.g., the heart, where heart valves and the walls move with different speeds), the search regions used in the frame interpolation may be selected or determined in adaptive manner. The assumption being that when attempting to interpolate images (particularly 3D images) of a complicated moving object, which may have varying particular speed and/or movement in each part, the interpolation may be made based on direct measurement or by combining the observation of different observation points. Thus, when attempting to determine the movement of particular object or structure in a frame (e.g., heart valve), where the movement of the valve may not be measured directly, and a plurality of different observation measurements may be used instead.

For example, the different observation measurements may correspond to a plurality of sub-images (e.g., m sub-images), with the total movement of the particular structured being determined as summation of the different movement measurements: $V_1+V_2+ \ldots +V_m$. The different observation measurements may correspond to, in this regard, different window sizes (size of search regions around the particular selected point in space). In particular, the different observation measurements may correspond to incremental reductions in the search regions. Thus, when applying FPME, the search region may be gradually reduced to find true motion vectors around particular point(s) (e.g., corresponding to the heart valve).

In an example use scenario, with reference to FIG. 3, when attempting to find a motion vector in the selected block 340, a sequences of 8 search regions may be used, starting with a large window around the sample block 340, corresponding to a block of size 225×225 and a movement vector of for example. A best match motion vector (e.g., $V_1$) for this window may be obtained (e.g., using DME). For example, where the frame interpolation is being done in the course of echocardiography, this large patch may correspond to imaging of the heart as one big moving object without caring out the movement of its parts (e.g., walls and valves). These parts may move in two different directions. Nonetheless, because the movements are not independent—e.g., because movement of the heart valve is not independent of the movement of the wall—obtaining motion vector corresponding to the heart as a whole is fine. After the first level of motion estimation, the window size may be reduced—e.g., corresponding to block of size 175×175. New best match motion vector(s) (e.g., $V_2$) related to this size may be obtained, after second iteration. The process may continue in this manner, measuring motion vectors for continually reduced size patches. The overall movement will be sum of all movements—e.g., where there are 8 iterations of reduced size patches, the total movement may be determined as: $V_T=V_1+V_2+ \ldots +V_8$.

In some instances, the obtained vector field may be noisy, which may cause some artifacts in motion compensated frame. Accordingly, the obtained vector field may be de-noised, by applying suitable de-noising techniques. For example, a de-noised vector field may be obtained by applying vector median filtering. In this regard, when applying vector median filtering to a particular block, a set of motions vectors corresponding to the selected block and one or more other blocks (e.g., the neighbor blocks) may be searched for the motion vector with smallest projection error on all neighboring motion vectors. The filtering search set may be, for example, 3×3 blocks (that is a particular block, as the center block, and its 8 neighboring blocks). Nonetheless, the search space may be of any size. Once the set of vectors, $V_R$, is determined (comprising the motion vectors of the selected block and its neighboring blocks), the new motion vector for the center block may set to the vector of $V_R$ that satisfies the following optimization equation (Eq. 3).

$$v = \mathrm{argmin}_{v \in V_R} \sum_{i=1}^{i=m} \|V - Vi\|, Vi \in V_R$$

The obtained motion vector(s) may then be used in generating the interpolated frames. For example, the motion vector(s) may be applied (e.g., for initialization) of a suitable optical flow method (e.g., Horn-Schunck method) which may be used in generating the interpolated frames.

In some instances, further processing may be done to address possible artifacts. For example, overlapped block motion compensation interpolation (MCI) may be applied remove blockiness artifact in the image. An example use of overlapped block motion compensation interpolation is described in more detail with respect to FIG. 4, below.

Accordingly, an FPME based implementation may comprise the following stages: 1) applying fixed point motion estimation (FPME) to obtain motion vectors; 2) removing outlier(s) by applying vector median filter to the obtained motion vectors; 3) using obtained motion vector(s) for initialization of a particular optical flow method (e.g., Horn-Schunck method) that is used to obtain the interpolated image; and 4) applying overlapped block motion compensation interpolation (MCI) to remove blockiness artifacts in the images.

Figure 4:
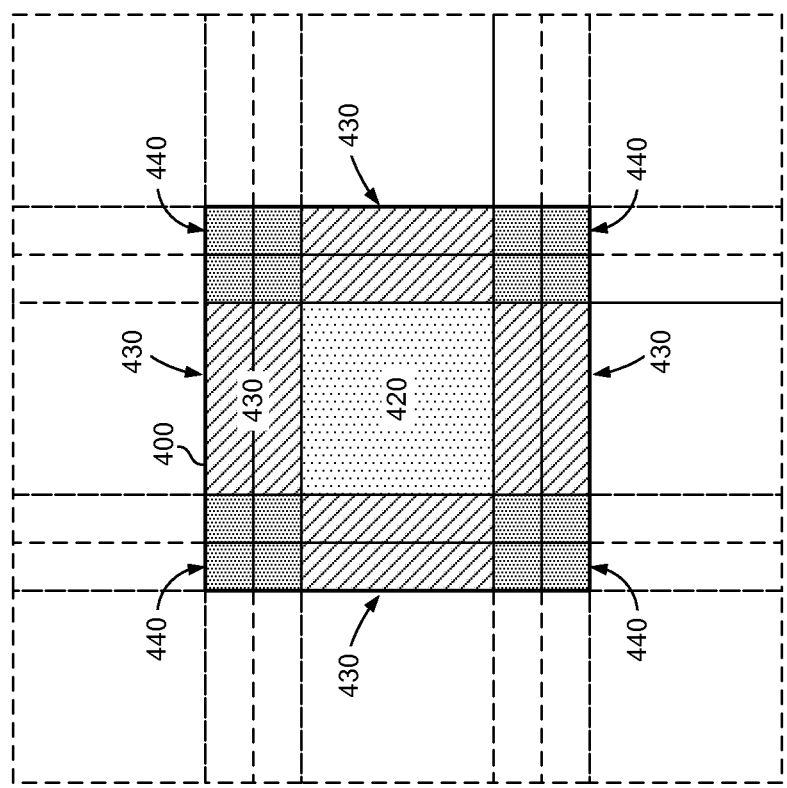
FIG. 4 is a block diagram illustrating use of Overlapped block motion compensation interpolation to correct blockiness in interpolated fames, in accordance with an embodiment of the invention.

FIG. 4 is a block diagram illustrating use of overlapped block motion compensation interpolation to correct blockiness in interpolated fames, in accordance with an embodiment of the invention. Shown in FIG. 4 is a frame (or portion thereof) 400, in which overlapped block motion compensation interpolation may be applied.

Overlapped block motion compensation interpolation may be used to remove the 'blockiness' artifact, which may be an effect of frame rate up-conversion based on frame interpolation by block matching. With respect to the example frame 400 depicted in FIG. 4, overlapped block motion compensation interpolation may applied to particular block 410, which may comprise three different overlap regions: region 420 with no overlap, region 430 with two overlap (with a neighboring block), and region 440 with four overlap (with 3 neighboring blocks). Thus, points in the interpolated frame corresponding to the three regions will be calculated by handling each region in corresponding manner. The region 410 (no overlap) has one motion vector, $\vec{v}$, so for each point p in this region, the following equation (Eq. 4) applies:

$$f_n(x, y) = \frac{1}{2}(f_{n-1}((x, y) - \vec{v}) + f_{n+1}((x, y) + \vec{v}))$$

The region 420 (two overlap) has two motion vectors: $\vec{v}_1$ and $\vec{v}_2$, so for each p in this region, the following equation (Eq. 5) applies:

$$f(n) = \frac{1}{2}\left(\frac{1}{2}(f_{n-1}(p - \vec{v}1) + f_{n+1}(p + \vec{v}1)) + \frac{1}{2}(f_{n-1}(p - \vec{v}2) + f_{n+1}(p + \vec{v}2))\right)$$

The region 430 (four overlap) has four motion vectors: $\vec{v}_1$, $\vec{v}_2$, $\vec{v}_3$, and $\vec{v}_4$, so for each p in this region, the following equation (Eq. 6) applies:

$$f(n) =$$
$$\frac{1}{2}\Big(\frac{1}{2}(f_{n-1}(p - \vec{v}1) + f_{n+1}(p + \vec{v}1)) + \frac{1}{2}(f_{n-1}(p - \vec{v}2) + f_{n+1}(p + \vec{v}2)) +$$
$$\frac{1}{2}(f_{n-1}(p - \vec{v}3) + f_{n+1}(p + \vec{v}3)) + \frac{1}{2}(f_{n-1}(p - \vec{v}4) + f_{n+1}(p + \vec{v}4))\Big)$$

Figure 5:
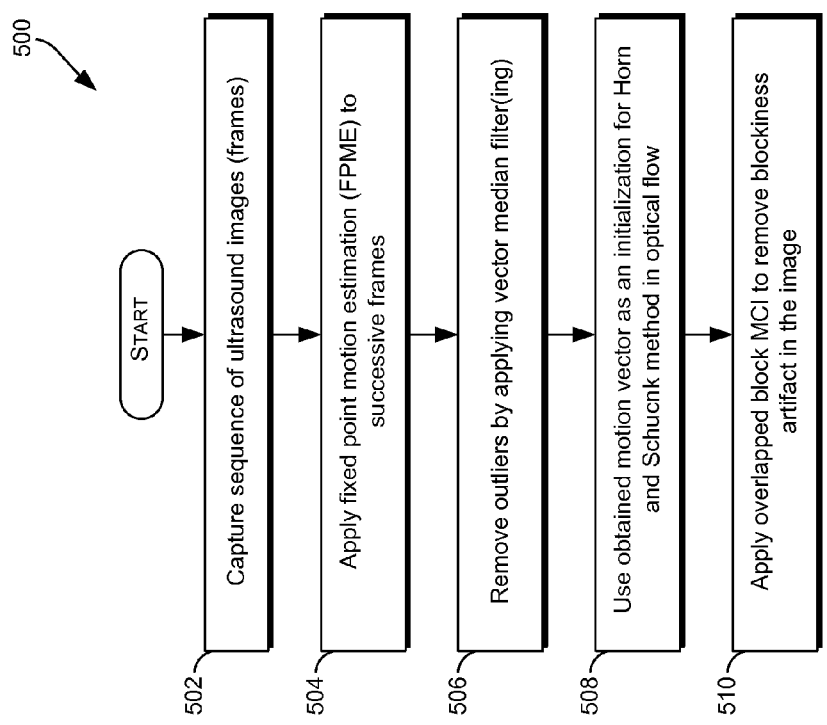
FIG. 5 is a flow chart illustrating example steps that may be utilized for providing enhanced frame rate upconversion in ultrasound imaging, in accordance with an embodiment of the invention.

FIG. 5 is a flow chart illustrating example steps that may be utilized for providing enhanced frame rate upconversion in ultrasound imaging, in accordance with an embodiment of the invention. Shown in FIG. 5 is a flow chart 500, which comprises a plurality of example steps.

It should be understood, however, that certain embodiments of the present invention may omit one or more of the steps, and/or perform the steps in a different order than the order listed, and/or combine certain of the steps discussed below. For example, some steps may not be performed in certain embodiments of the present invention. As a further example, certain steps may be performed in a different temporal order, including simultaneously, than listed below.

In step 502, a sequence of ultrasound images (frames) may be obtained. In particular, the ultrasound images may be 3D frames and/or may relate to areas having particular complex motion profile (e.g., heart).

In step 504, fixed point motion estimation (FPME) may be applied. In this regard, the FPME may be applied as iterative motion estimation, starting with a (large) block size, with the block size being reduced in each iteration. The final velocity vector for each point may then be determined based on summing of the displacement vectors from all iterations.

In step 506, outliers may be removed, such as by applying vector median filter/filtering.

In step 508, the obtained motion vector may be used during motion compensations—e.g., as an initialization input an optical flow stage (e.g., for Horn-Schunck method).

In step 510, blockiness artifacts may be removed, such as by application of overlapped block motion compensation interpolation may be applied to remove blockiness.

Figure 6:
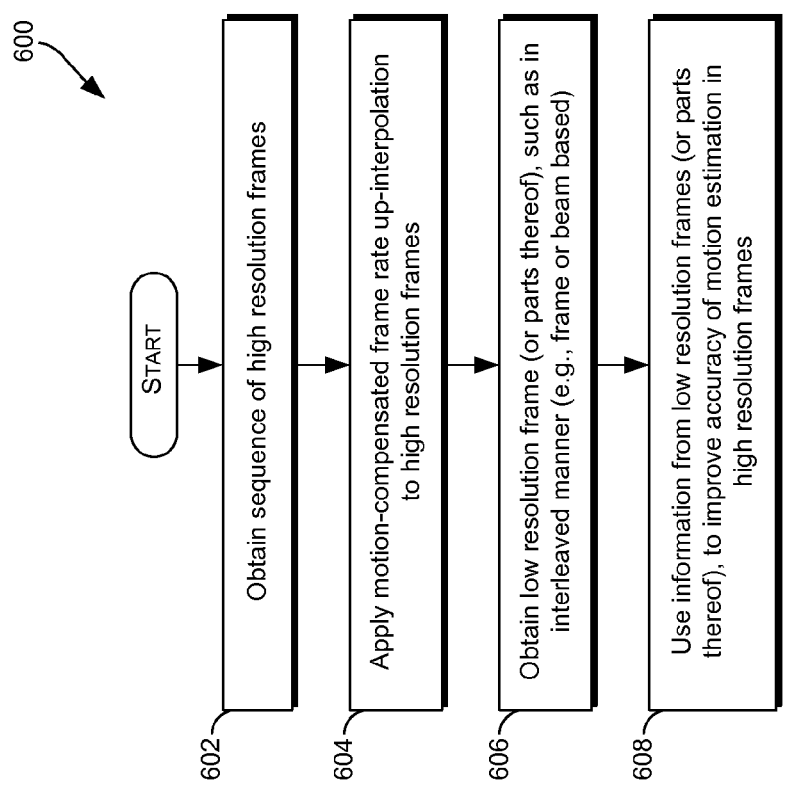
FIG. 6 is a flow chart illustrating example steps that may be utilized for improving accuracy of motion-compensated frame rate up-interpolation, in accordance with an embodiment of the invention.

FIG. 6 is a flow chart illustrating example steps that may be utilized for improving accuracy of motion-compensated frame rate up-interpolation, in accordance with an embodiment of the invention. Shown in FIG. 6 is a flow chart 600, which comprises a plurality of example steps.

It should be understood, however, that certain embodiments of the present invention may omit one or more of the steps, and/or perform the steps in a different order than the order listed, and/or combine certain of the steps discussed below. For example, some steps may not be performed in certain embodiments of the present invention. As a further example, certain steps may be performed in a different temporal order, including simultaneously, than listed below.

In step 602, a sequence of high-resolution ultrasound images (frames) may be obtained. In this regard, the ultrasound images may be 3D frames and/or may relate to areas having particular complex motion profile (e.g., heart).

In step 604, motion-compensated frame rate up-interpolation may be applied to the obtained high-resolution frames.

In step 606, low resolution frames (or parts thereof) may be obtained, such as in interleaved manner (e.g., frame or beam based), corresponding to the high-resolution frames.

In step 608, information may be obtained from low resolution frames (or parts thereof), and that information may be used in improving accuracy of motion estimation in high resolution frames. The information may obtained solely from the low resolution frames (or parts thereof), or from the combination of the low resolution frames (or parts thereof) and the high resolution frames. The information may relate to, for example, tracking of motion of certain objects or structures in the low resolution frames (or parts thereof) and/or the high resolution frames.

As utilized herein the term "circuitry" refers to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "example" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the invention may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for providing sequential needle recalibration by correlating a sequence of calibration data for a tracking system to a plurality of corresponding ultrasound probe positions.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
applying by a processor of an ultrasound system, motion blur reduction to one or more three-dimensional (3D) images, the motion blur reduction comprising:
applying motion estimation based on an initial block size;
iteratively applying motion estimation for one or more other iterations,
wherein block size associated with each iteration is reduced in relation to block size of a previous iteration; and
determining a final velocity vector by summing displacement vectors from all iterations; and
applying by the processor of the ultrasound system, improvement to motion-compensated frames, by:
obtaining for motion-compensated frames or portions thereof, corresponding lower resolution frames or portions of a frame; and
processing the motion-compensated frames or the portions thereof, to enhance motion related characteristics in the motion-compensated frames, based on information obtained from the obtained lower resolution frames or the portion of a frames.

2. The method according to claim 1, comprising applying the motion blur reduction during frame rate upconversion.

3. The method according to claim 2, comprising applying the motion blur reduction to interpolated frames during the frame rate upconversion.

4. The method according to claim 1, comprising applying the motion estimation based on dual motion estimation (DME).

5. The method according to claim 1, comprising applying vector median filtering to velocity vectors obtained during motion blur reduction.

6. The method according to claim 1, comprising applying a vector field corresponding to velocity vectors obtained during motion blur reduction as an input in an optical flow processing.

7. The method according to claim 1, comprising applying overlapped block motion compensation interpolation to each image to which motion blur reduction is applied, to remove blockiness artifacts.

8. The method according to claim 1, comprising processing the motion-compensated frames or portions thereof based on information obtained from tracking of motion of structures between motion-compensated frames or portions thereof and lower resolution frames or the portions of a frame.

9. The method according to claim 8, comprising obtaining the lower resolution frames or portions of a frame on per-frame or per-beam interleaved acquisition scheme.

10. A system, comprising:
an ultrasound device comprising a processor operable to:
apply motion blur reduction to one or more three-dimensional (3D) images, the motion blur reduction comprising:
applying motion estimation based on an initial block size;
iteratively applying motion estimation for one or more other iterations, wherein block size associated with each iteration is reduced in relation to block size of a previous iteration; and
determining a final velocity vector by summing displacement vectors from all iterations; and
apply improvement to motion-compensated frames, by:
obtaining for motion-compensated frames or portions thereof, corresponding lower resolution frames or portions of a frame; and
processing the motion-compensated frames or the portions thereof, to enhance motion related characteristics in the motion-compensated frames, based on information obtained from the obtained lower resolution frames or the portion of a frames.

11. The system according to claim 10, wherein the processor is operable to apply the motion blur reduction during frame rate upconversion.

12. The system according to claim 11, wherein the processor is operable to apply the motion blur reduction to interpolated frames during the frame rate upconversion.

13. The system according to claim 10, wherein the processor is operable to apply the motion estimation based on dual motion estimation (DME).

14. The system according to claim 10, wherein the processor is operable to apply vector median filtering to velocity vectors obtained during motion blur reduction.

15. The system according to claim 10, wherein the processor is operable to apply a vector field corresponding to velocity vectors obtained during motion blur reduction as an input in an optical flow processing.

16. The system according to claim 10, wherein the processor is operable to apply overlapped block motion compensation interpolation to each image to which motion blur reduction is applied, to remove blockiness artifacts.

17. The system according to claim 10, comprising processing the motion-compensated frames or portions thereof based on information obtained from tracking of motion of structures between motion-compensated frames or portions thereof and lower resolution frames or the portions of a frame.

18. The system according to claim 17, comprising obtaining the lower resolution frames or portions of a frame on per-frame or per-beam interleaved acquisition scheme.

19. A non-transitory computer readable medium having stored thereon, a computer program having at least one code section, the at least one code section being executable by a machine for causing the machine to perform steps comprising:
applying motion blur reduction to one or more three-dimensional (3D) images, the motion blur reduction comprising:
applying motion estimation based on an initial block size;
iteratively applying motion estimation for one or more other iterations, wherein block size associated with each iteration is reduced in relation to block size of a previous iteration; and
determining a final velocity vector by summing displacement vectors from all iterations; and
applying improvement to motion-compensated frames, by:
obtaining for motion-compensated frames or portions thereof, corresponding lower resolution frames or portions of a frame; and
processing the motion-compensated frames or the portions thereof, to enhance motion related characteristics in the motion-compensated frames, based on information obtained from the obtained lower resolution frames or the portion of a frames.

* * * * *